T. M. MUELLER.
COMBINED MAGNETO AND BATTERY IGNITION SYSTEM.
APPLICATION FILED JUNE 30, 1909.
1,095,985.
Patented May 5, 1914.
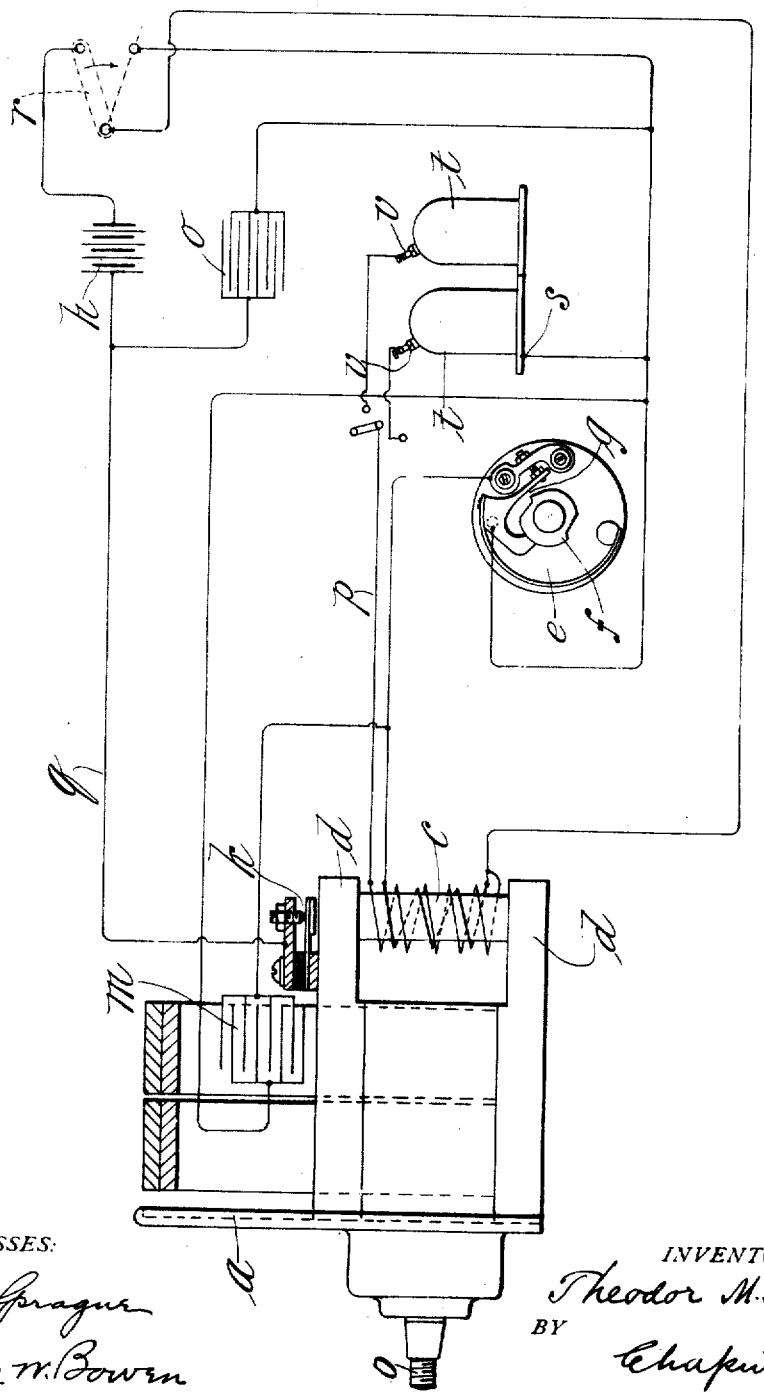
WITNESSES:
H. L. Sprague
Harry W. Bowen
INVENTOR.
Theodor M. Mueller
BY
Chapin & Co.
ATTORNEY.

UNITED STATES PATENT OFFICE.

THEODOR M. MUELLER, OF PITTSFIELD, MASSACHUSETTS, ASSIGNOR TO PITTSFIELD SPARK COIL COMPANY, OF DALTON, MASSACHUSETTS, A CORPORATION OF MASSACHUSETTS.

COMBINED MAGNETO AND BATTERY IGNITION SYSTEM.

1,095,985.  Specification of Letters Patent.  Patented May 5, 1914.

Application filed June 30, 1909.  Serial No. 505,141.

*To all whom it may concern:*

Be it known that I, THEODOR M. MUELLER, a subject of the Emperor of Germany, residing at Pittsfield, in the county of Berkshire and State of Massachusetts, have invented new and useful Improvements in Combined Magneto and Battery Ignition Systems, of which the following is a specification.

This invention relates, broadly, to electrical ignition devices and more specifically to a construction in which an ignition system having two sources of electrical energy is practically embodied into one system so that the current from both sources being employed to produce a current in the spark circuit, a two-point switch serving to cut in the magneto for generating a current in the spark circuit and cut out the battery; or, inversely, to cut in both the magneto and the battery; (into the spark circuit) in which case the primary of the induction coil of the magneto and the interrupter are included in the battery circuit, the interrupter acting as a timer; and in this combined circuit is included also a vibrator located in operative relation to the poles of the magneto and having the same function, when the battery circuit is in use, as the vibrator of an ordinary induction dash-board coil has in the well known battery systems of ignition, as generally constructed today.

As further explaining the utility of this invention, its characteristics are such that when the magneto is running at such a low rate of speed as to give a very feeble spark, the battery may be switched in circuit with the magneto, thereby supplementing the energy generated by the latter: In other words, in cranking the engine, if the battery is in circuit, not only is the full battery current available, but as much more as may be generated by the magneto.

In further explanation of the utility of the invention, it may be stated that if for any reason the magneto, as such, becomes inoperative, the battery system will operate as such as long as the armature shaft of the magneto is rotated to properly time the sparking at the gap in the plug, regardless of whether any current is produced in the magneto, or not. When the magneto is running at its maximum capacity, the battery may still be switched in to augment the output of the current in the spark circuit.

Dual ignition systems, *per se*, are not new, but these involve, generally, one set of spark-plugs with which the battery is connected, a suitable induction coil or coils being included in the battery circuit, and the other system comprising a separate set of plugs and connection with a magneto. This invention differs radically from the constructions heretofore described in that it embodies a combination of the magneto and battery systems, which are coacting, and only one set of spark-plugs is required for the use of either system independently, or for the use of the magneto supplemented by the battery, only a single switch being required for the purpose of cutting the battery current into the circuit containing the current generated by the magneto.

When it is said, as stated above, that the two systems may be used independently, what is meant thereby is that the battery circuit is entirely operative if the magneto produces no current at all, but the rotation of the armature shaft of the magneto is necessary for use with the battery circuit for the reason that the movements of the interrupter are necessary to provide for the correct timing of the sparks at the plugs. When it is stated that the current from the battery is supplemental to the magneto current when the two sources of energy are used together, it is to be understood by this statement that when the rotation of the armature of the magneto is so slow, as in starting an engine for example, that an unsatisfactory spark is produced, the requisite energy is supplied from the battery and therefore at very low speeds of rotation of the armature shaft of the magneto a spark will be produced in the secondary sufficient to ignite the charge.

The invention is illustrated in the accompanying drawing, which consists of but one figure showing, in a diagrammatic form, a magneto of the inductor type like the one shown in applicant's prior Letters Patent of the United States, dated December 21, 1909, #943,697, in which the windings are stationary, (the interrupter of which is separated therefrom), a battery, and a vibrator operatively associated with the magnetic field of the magneto, and condensers with the necessary connections; two cylinders of an internal combustion engine being shown with spark-plugs therein.

Referring now to the drawing, $a$ indicates as a whole the magneto; $b$ being the armature shaft thereof; $c$ the induction coil (in this instance located between and forming a part of the magnetic circuit of the pole-pieces $d$ of the magneto through which the flux alternately surges); $e$ shows the interrupter of the magneto which is of the two-point contact type, one of these contact points being indicated by the cam $f$, and the other by the pivotally mounted arm $g$ whereby two breaks are made in the primary circuit of the induction coil $c$ to one revolution of the interrupter. Therefore, if the ignition system is to be used in connection with a four-cylinder motor, the armature shaft of the magneto would have to run at crank-shaft speed of the motor; if with two cylinders, at cam-shaft speed.

The battery is indicated by $h$, and the vibrator by $k$.

On the magneto is a condenser $m$ connected around the terminals of the interrupter, and at a suitable point in the battery circuit is another condenser $o$, parallel with the vibrator.

The circuits between the magneto and the spark-plugs are established in the usual manner in setting up high tension magnetos, and in connecting up the battery to operate in the manner described with the magneto, a vibrator $l$ is mounted (as for example in the manner shown in the drawings, on one of the extended pole-pieces $d$) one side of the vibrator being connected by the wire $q$, with one side of the battery, and the other side through the induction coil and interrupter (which, when used in this connection becomes a timer) with the other side of the battery, through the switch $r$. This part of the circuit is properly grounded, as at $s$, that is, connected with the engine $t$, with which the outer shell of the spark-plugs is in electrical connection, thus completing the circuit through the plug $v$.

The various circuits are traced as follows: Consider the switch $r$ in the dotted position shown, the current then flows from the battery $h$, wire $q$, vibrator $k$ to the frame of the magneto or ground to the pivotal contact arm $g$, primary winding of the coil $c$, back to the other pole of the battery $h$. The current from the battery therefore assists or augments the current generated in the primary of the coil $c$ by reason of the alternating flux through the core from one extended pole $d$ to the other with the result that the spark current induced in the secondary is increased. When the timer short circuits or closes the circuit through the primary and battery, as stated, the vibrator is actuated by the increased flux through the core and extended pole-pieces $d$, causing a series of sparks to appear at the plugs in the secondary or spark circuit. When the battery is not connected in series with the primary winding of the induction coil $c$, the vibrator is not actuated by the surging magnetic flux from one pole to the other through the core of the coil. The purpose of the vibrator therefore is to increase the inductive effect in the secondary winding by rapidly opening and closing the circuits through the primary. When the switch $r$ is moved in the direction indicated by the arrow, the battery is cut out and the flow of the current is then as follows:—primary of coil $c$ to the pivotal member $g$ to the contact plate back to the other terminal of the primary. As the circuit through the primary is made and broken by the cam $f$ which is connected to the armature shaft $b$, an induced or spark current is generated in the secondary winding which is sufficient, when the motor is running at high speed, to fire the charge in the engine cylinder. At starting, however, it is necessary to use the current from the battery in addition to that produced by the generator to start the motor, then cut out the battery and run with the magneto alone.

In practice, the wire $p$ is provided with a distributer mechanism for the spark current, as conventionally shown in the drawings. It will also be seen that by means of my ignition system it is possible to start the engines from the seat of the vehicle by means of the current from the battery alone by closing the switch lever $r$ so that the current from the battery will flow through the primary winding of the coil, it being understood that the make and break contacts are closed by the cams $f$. This system is therefore of the dual ignition type, that is to say current from the battery and that from the magneto will ignite the charge. When the battery alone is used the vibrator effects the opening and closing of the primary circuit to produce the induction effect in the coil $c$.

What I claim, is:—

1. An electrical ignition system comprising a generator for causing a flux of a certain density to flow through the core of the primary and secondary winding of the generator, a make and break device adapted to be driven by the armature shaft of the generator, a battery, a switch, a vibrator adapted to be actuated by the combined magnetic flux produced by the generator and the battery, electrical connections between the primary of the coil, make and break device, battery, switch and vibrator, whereby when the switch is in one position the current from the battery will be connected in series with the primary of the coil and the vibrator actuated, and when in another position the battery will be cut out and the current in the primary will be generated by the flux from the generator, substantially as described.

2. In an ignition system, the combination with an electric generator of the inductor type with stationary winding, a second source of electric energy, means for connecting the source of the current from said second source of electric energy in series with the source of the current produced by the generator, a vibrator associated with the field magnets of the generator and adapted to be operated by the flux therein which is produced by the combined currents from the two sources of electric energy, and a make and break device included in said series circuit, substantially as described.

3. In an ignition system, the combination with an electric generator, a second source of electric energy, means for connecting the source of the current from said second source of electrical energy in series with the current produced by the generator, a vibrator associated with the field magnet of the generator and adapted to be operated by the field flux of the generator which is produced by the combined currents from the two sources of electric energy, a make and break device included in said series circuit, and condensers connected across the terminals of the make and break device and the vibrator, substantially as described.

4. An electric ignition system for internal combustion engines having in combination with an induction coil forming a part of the field magnetic circuit of the generator, means for producing a magnetic flux of a definite density through the core of said coil by the magneto, means including a second source of electric energy for increasing the normal density of the magnetic flux in said core when the same is connected to the primary of the coil, and a vibrator associated with the magnetic field and adapted to be operated by the combined magnetic flux produced therein, a make and break device for the primary winding, electrical connections thereof, spark terminals and connections therefor to the secondary winding.

5. An electrical ignition system comprising a generator for causing a flux of a certain density to flow through the core of the primary and secondary winding of the generator, a make and break device adapted to be driven by the armature shaft of the generator, a battery, a switch, electrical connections between the primary of the coil, make and break device, battery and switch, whereby when the switch is in one position the current from the battery will be connected in series with the primary of the coil, and when in another position the battery will be cut out and the current in the primary will be generated by the flux from the generator, substantially as described.

THEODOR M. MUELLER.

Witnesses:
 GEO. O. MACGREGOR,
 ALBERT H. FOSTER.